April 7, 1959 R. P. LOGAN 2,881,137
BACTERIAL DIGESTION OF ORGANIC MATTER
Filed July 1, 1954 2 Sheets-Sheet 1

INVENTOR
ROBERT P. LOGAN,
BY *William J. Fox*
ATTORNEY

United States Patent Office 2,881,137
Patented Apr. 7, 1959

2,881,137

BACTERIAL DIGESTION OF ORGANIC MATTER

Robert P. Logan, Westport, Conn., assignor to Dorr-Oliver Incorporated, a corporation of Delaware Application July 1, 1954, Serial No. 440,666

7 Claims. (Cl. 210—14)

This invention relates to the digestion of waste materials contained in liquids either in dissolved or in solid form. The class of liquids referred to includes, for example, sewage sludge, and industrial wastes such as are derived from fermentation proceses, and packing house operations. More particularly, this invention relates to the control of the environmental pH of the digesting material for the purpose of maintaining optimum conditions for the digestive micro-organisms.

The invention will herein be presented as it applies to the digestion of sewage sludges, but this is not to be deemed a limitation as to general concept or scope of applicability. Consequently, the sewage sludge dealt with in the following, stands in lieu of any other similarly digestible material.

It is well known that approximately 60% of the suspended solids in sewage and similar polluted liquids are removed by sedimentation alone, approximately 75% by sedimentation and chemical coagulation, and approximately 90% by so-called "complete" treatment, that is, by primary sedimentation, oxidation, and secondary sedimentation. The sludges composed of these solids are, by comon practice, removed to one or more digestion stations, where, under anaerobic conditions, they undergo bacterial decomposition. The solids are liquefied and gassified and their overall volume reduced, subsequent disposal is facilitated, and valuable gas is produced.

The digestion of fresh sludge starts with an acid reaction due to fermentation, or bacterial action involving carbonaceous matter, and this is followed by the alkaline reaction of putrefaction, or bacterial action involving nitrogenous matter. Both these reactions may be permitted to take place simultaneously in a single digester, or they may be separated into two or more tanks, a practice known as stage digestion. In both cases, pH plays a major, if not critical, role in the satisfactory operation of the installation.

Approaching the question of bacterial activity from a somewhat different direction, it may be said that sludge digestion is the result of the activities of two broad classes of bacterial, (a) acid producers, and (b) gas producers. Without going into detail concerning the mechanism of these activities, one can state generally that the acid producers are those bacteria which break down the solid matter of the sludge to the lower fatty acids such as, for example, acetic, proprionic, and butyric, which are known as volatile acids. The gas producers are those bacteria which convert these volatile fatty acids to methane and carbon dioxide. If the digester is operating properly, a balance is set up between the rates of activity of the acid producers and that of the gas producers. With such a balance, the pH of the digesting sludge is normally about 7.0 to 7.2. It should be noted at this point that the organisms involved in anaerobic digestion, and especially the gas producers, are very sensitive to the pH of their environment. In fact, a drop in pH of as little as 0.1 or 0.2 from the normal operating range, may materially inhibit their rate of activity.

If for any reason, the rate of activity of the gas producing bacteria is less than that of the acid producing bacteria, an accumulation of volatile acids must result, whereby the pH of the sludge will be depressed. Furthermore, since the gas producers are more sensitive to a change in environmental pH than are the acid producers, a decline in pH will result in a decline in gas producer activity. A further drop in pH must necessarily follow since the volatile acids are not being consumed by the gas producers as rapidly as they were previously, and a vicious cycle ensues. Under these circumstances the pH will drop to a value between 5 and 6, at which value even the activity of the acid producers is so inhibited that, for all effects and purposes, the digester ceases to function.

It has been observed that under certain unfavorable operating conditions such as overloading, there is a tendency for the acid producing reaction to predominate. The determinal effects resulting from such increasing acidity is one of the major difficulties encountered in the operation of installations of this nature. Among other difficulties arising, is the formation of large quantities of dense tenacious foam at the surface of the digester tank contents, sometimes present in such quantities that the gas collecting space in the uppermost portion of the unit is invaded by, and in some instances filled with, the foam. Such foaming is caused by the excessive accumulation of volatile acids due to the unbalance existing between the activity of the acid producing and of the gas producing bacteria. When the handicap of unfavorable environment incident to the low pH is removed, the gas producers multiply very rapidly because of the excess of food in the form of volatile acids available to them. Indeed, their propagation and gas producing activity is then so rapid that the gassification is violent, and foaming results.

The prior art in the field of sludge digestion discloses three conventional means for combating the problem of low pH, and the operational difficulties arising therefrom. In some instances digester volume has been radically increased, it having been observed that the large volume of sludge present tends to reduce the possibility of sudden pH drops. Another solution has been to concentrate the sludge entering the digester. The theory behind this approach rests on the fact that a direct, proportional relationship exists between the quantity of volatile solids destroyed in the digestion process and the alkalinity produced. The relationship being quantitative, for a given number of pounds of volatile solids entering the unit, a certain number of pounds of alkalinity is formed. Therefore, the less diluent liquid present in the influent to the digester, the greater will be the ultimate alkalinity concentration, and the pH will be correspondingly higher.

The third and most common practice for maintaining correct pH has been the addition of lime, dolomite dust or some similar alkaline material to the digester. Beneficial effects are sometimes produced, but, because of the inherent difficulty involved in this procedure, insofar as quantities to be added and proper mixing are concerned, effects quite as harmful as those resulting from the low pH may be encountered. As a matter of fact, at times the precipitous reaction induced by the addition of the alkaline material actually increases foaming. Moreover, it is well known that among the principal constituents of sewage sludge, the vegetable and animal fats are prominent. Even before these fats are reduced to the voltatile acid described above they must be hydrolized to glycerol and the higher fatty acids such as oleic, palmitic, stearic, etc. These higher fatty acids form insoluble salts with the metallic elements of the alkaline additive materials in much the same way that soap reacts with hard water to form a "curd." The insoluble salt obviously cannot be attacked by the bacteria for further reduction.

The principal object of my invention is to provide a method and means for simply and accurately controlling the pH of digesting sludge without resorting to the present practices of utilizing oversize digesters, sludge concentration, or the addition of alkaline materials, and consequently, without encountering the difficulties attendant to these practices as hereinabove set forth. I attain this object by contacting the digesting sludge with a carrier gas capable of absorbing carbon dioxide therefrom at a rate which results in the attainment of a safe pH level in the digesting sludge. In one embodiment of my invention I provide such a carrier gas by employing digester gas from which all or part of the carbon dioxide has been stripped, but it should be noted that any gas of relatively low solubility in digesting sludge, and with little or no carbon dioxide may be used as the carrier gas. In any case, the mechanism of removal involves the transfer of carbon dioxide from solution within the digesting sludge, to bubbles of a carrier gas with which the digesting sludge is contacted.

Through the practice of the teachings of my invention, one may, without using seed sludge, bring a newly started digester up to the requisite pH for full operating efficiency much more rapidly than is at present feasible. In addition, the low pH and related problems engendered by the digestion of dilute sludges, as is particularly the case in activated sludge plants, can be prevented or corrected by lowering the dissolved carbon dioxide concentration of the sludge as herein set forth. The intermittent or widely fluctuating feeding of raw sludge to the digester also tends to result in a lowering of the pH to a value below that required for satisfactory operation, a condition which is again correctible through the application of the procedures disclosed. The above applications of my invention are among those hereinafter dealt with in detail.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
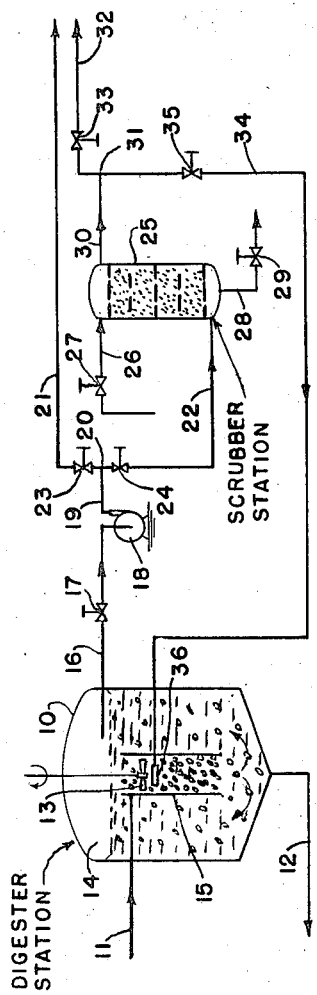
Figure 1 is a flow diagram representing the basic embodiment of my invention.

In Figure 1, the three principal elements of my invention are illustrated; said elements being a sludge digester 10, a gas transfer pump 18 and a gas scrubbing station 25. While any of the commonly used digesters are adaptable to the incorporation of my invention, the design shown utilizes a downflow draft tube mixer, and is equipped with influent and discharge means, pipes 11 and 12 respectively, a mechanically driven rotor 13, a recycled gas diffusion means 36 and a centrally located draft tube 15. A conduit 16 fitted with control valve 17 serves to transmit digester gas from the gas space 14 to the suction side of gas transfer pump 18. Conduit 19 connects the discharge end of the gas transfer pump to juncture 20 whence conduits 21 and 22 emanate. Conduit 21 is a gas take-off line, the flow through which is regulated by control valve 23. Conduit 22, the flow through which is regulated by control valve 24, leads to the gas scrubber station 25, said scrubber station being equipped with an absorbent liquid influent means 26 with associated control valve 27, and a spent absorbent liquid discharge means 28 with associated control valve 29. Following passage through the scrubber station, the gas enters conduit 30 and is transmitted to juncture 31 whence conduits 32 and 34 emanate. Conduit 32 is an alternate gas take-off line, the flow through which is regulated by control valve 33. Conduit 34, the flow through which is regulated by control valve 35, leads back to the digester, and terminates in the gas diffusion means 36. It should be pointed out that the location of gas transfer pump 18 is not critical, and that under certain conditions it may be more advantageous to locate the said pump on the downstream side of the gas scrubber station.

The operative process constituting the subject matter of my invention, while cyclic in nature, may, for purposes of clarity, be regarded as commencing at the same point as does the apparatus embodiment described above, namely by the removal of digester gas from the gas space 14. The digester gas, as has already been stated, is composed of a number of gases, chief among them being methane and carbon dioxide, the former being relatively insoluble and the latter relatively soluble. In order to effect the removal of the carbon dioxide, for reasons hereinbefore set forth, the digester gas is transmitted to a gas scrubber station 25 which is schematically shown as being of the packed tower type, wherein a liquid carbon dioxide absorbent is introduced in the upper part of the unit and permitted to trickle down through a porous bed of inert solid material counter-current to the stream of gas to be stripped, which is introduced near the bottom and rises upwardly through the porous bed. The intimate liquid-gas contact thus achieved serves effectively to remove one or more of the gas constituents, depending on the nature of the absorbent liquid, the gas removed in this case being, of course, the carbon dioxide. It should be noted that any of the well known gas scrubbers, including the bubble diffusion types, the spray types, and others, would be equally satisfactory, and the packed tower shown should not be regarded as a limitation to that type. The gas from which the carbon dioxide has been totally or partially stripped, leaves the scrubber station 25 wherein the stripping occurred and is returned for diffusion into the sludge within the digester 10.

While the embodiment presented in the figures shows the gas diffusion means 36 as being located within the draft tube 15 and immediately beneath the rotor 13, this arrangement should not be deemed limiting in nature. Satisfactory operation can be achieved by any arrangement wherein the gas is diffused into a relatively confined zone through which the digesting sludge is impelled, and in which mechanical agitation is present to intimately mix the digesting sludge and the returned gas. Thus, in the embodiment shown, the confined zone takes the form of a downflow draft tube equipped with an impelling rotor. Another embodiment would be the utilization of a gas-sludge contacting station external to the digester proper, particularly where the digester design calls for the transfer of digesting sludge to an external station for the purpose of heating, mixing, or etc. Moreover, under certain circumstances it may be advantageous not to use a confined zone for stripped gas reintroduction. In such cases stripped digester or other gas low in carbon dioxide content may be dispersed into the digesting sludge by means of one or more fixed diffusers located at or near the bottom of the digester unit, or by means of a rotating gas distribution member immersed within the sludge and serving to disperse the stripped gas into an annular zone about the vertical axis of the digester.

Excess gas, over and above that required for recirculation, may be withdrawn by means of either or both of the gas take-offs, namely conduit 21 with control valve 23 or alternate conduit 32 with control valve 33. The choice of take-offs will depend on the quality of gas desired. If conduit 21 is used, the gas will contain some carbon dioxide and hydrogen sulphide picked up from the sludge. Gas withdrawn by means of alternate conduit 32 will have had most of these constituents stripped from it. The size or operating rate of the gas scrubber will, of course, be effected by the draw-off conduit used, since greater volumes of gas must be treated if stripped gas is diverted for use elsewhere.

Figure 2:
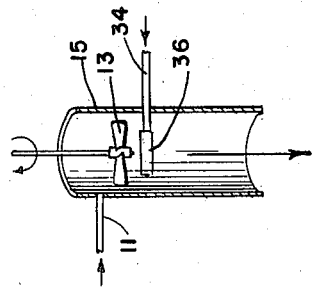
Figure 2 is an enlarged view of a portion of the central draft tube within the digester.
Figure 3:
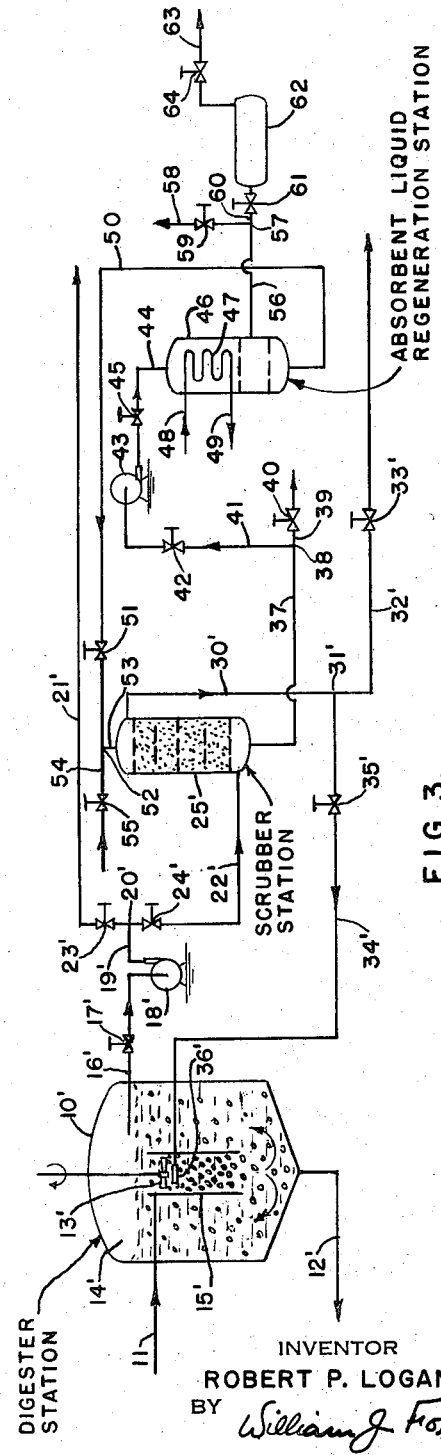
Figure 3 is a flow diagram illustrating my invention with the additional features of spent absorbent liquid regeneration and carbon dioxide gas recovery.

In Figure 2, the portion of the central draft tube utilized for the admission of raw sludge and the diffusion of recirculated, stripped gas in the particular embodiments of Figures 1 and 3 is illustrated. Raw sludge entering the draft tube 15 by means of influent pipe 11 passes into, and and is mixed with, digesting sludge moving in a downwardly direction through the said tube. Rotor 13, to which motive power is furnished by an external driving means, acts on the mixture of raw and digesting sludge, impelling it downwardly past the gas diffusion means 36. Stripped gas entering the said diffusion means by way of conduit 34, is discharged into the sludge stream, and, due to the turbulence existing at the zone of introduction, is intimately mixed therewith.

The process illustrated by Figure 3 is similar to that shown in Figure 1 except that the additional feature of regeneration of the spent absorbent liquid used in the scrubber station is provided for, together with possible use of the carbon dioxide gas thus recovered. Consequently, the principal elements shown are a sludge digester 10′, a gas transfer pump 18′, a gas scrubbing station 25′, a liquid transfer pump 43, and an absorbent liquid regeneration station 46. The components designated by the primed numbers of Figure 3, namely 10′ through 25′ and 30′ through 36′, correspond to the components having the same numerical designation, but which appear unprimed, in Figure 1. Thus, sludge digester 10′ is again of the downflow draft tube type, and is equipped with influent and discharge means, pipes 11′ and 12′ respectively, a mechanically driven rotor 13′, a recycled gas diffusion means 36′ and a centrally located draft tube 15′. A conduit 16′ fitted with control valve 17′ serves to transmit digester gas from the gas space 14′ to the suction side of gas transfer pump 18′. Conduit 19′ connects the discharge end of the gas transfer pump to juncture 20′ whence conduits 21′ and 22′ emanate. Conduit 21′ is a gas take-off line, the flow through which is regulated by control valve 23′. Conduit 22′, the flow through which is regulated by control valve 24′ leads to the gas scrubber station 25′. Following passage through the scrubber station, the gas enters conduit 30′ and is transmitted to juncture 31′ whence conduits 32′ and 34′ emanate. Conduit 32′ is an alternate gas take-off line, the flow through which is regulated by control valve 33′. Conduit 34′, the flow through which is regulated by control valve 35′ leads back to the digester, and terminates in the gas diffusion means 36′.

Spent absorbent liquid leaves the scrubber station by means of pipe 37 and is transmitted thereby to juncture 38 whence pipes 39 and 41 emanate. Pipe 39 is an absorbent liquid drain, the flow through which is controlled by valve 40. Pipe 41 with its associated control valve 42 transmits the spent absorbent liquid to the suction side of transfer pump 43. Pipe 44, with associated control valve 45 serves to connect the discharge side of the transfer pump to absorbent liquid regeneration station 46. In the embodiment shown the said regeneration station is equipped with heating coils 47 receiving heating medium through pipe 48 and discharging the said heating medium through pipe 49. Following passage through the regeneration station, the absorbent liquid enters pipe 50 with associated control valve 51 and is transmitted thereby to juncture 52 whence pipes 53 and 54 emanate. Pipe 54 with associated control valve 55 is an absorbent liquid feed serving to add fresh absorbent liquid to the system where such replenishment or replacement is necessary. Pipe 53 serves to transmit absorbent liquid from the juncture 52 back to the gas scrubber station 25′. Carbon dioxide recovered in the course of the absorbent liquid regeneration process is carried by conduit 56 to juncture 57 whence conduits 58 and 60 emanate. Conduit 58 with associated control valve 59 is a carbon dioxide gas discharge means. Conduit 60, with associated control valve 61 serves to transmit carbon dioxide gas to storage tank 62, whence it is removed to use by means of conduit 63 with associated control valve 64.

As was the case with the gas transfer pump 18′, the location of the absorbent liquid transfer pump 43 is not critical, and under certain circumstances it may more advantageously be located on the downstream side of the regeneration station 46. Furthermore, the recovery and storage of carbon dioxide gas is not an essential feature of this invention, the carbon dioxide gas evolved in the regeneration process being discharged to waste if no practical use for it is present.

Processwise also, the embodiment shown in Figure 3 is identical with that of Figure 1, except for the additional feature of absorbent liquid regeneration which is present in the case of the Figure 3 embodiment. Spent absorbent liquid is, in the Figure 3 embodiment, transmitted by means of absorbent liquid pump 43 from the scrubber station 25′ to the regeneration station 46 where, as shown schematically, heat is applied and dissolved gases picked up in the course of the scrubbing operation are driven off. The regeneration process need not, of course, involve heating. One alternate method for achieving an analogous and equally satisfactory result, at least insofar as this invention is concerned, would be to introduce the spent absorbent liquid into a vacuum degassifier wherein the low pressures prevailing act to force dissolved gases out of solution.

Regenerated liquid flows back to the scrubber station 25′ where it is again brought into contact with digester gas. Carbon dioxide gas evolved in the regeneration unit is removed therefrom, and, as stated previously, may be discharged to waste, or may be stored for future use.

Figure 4:
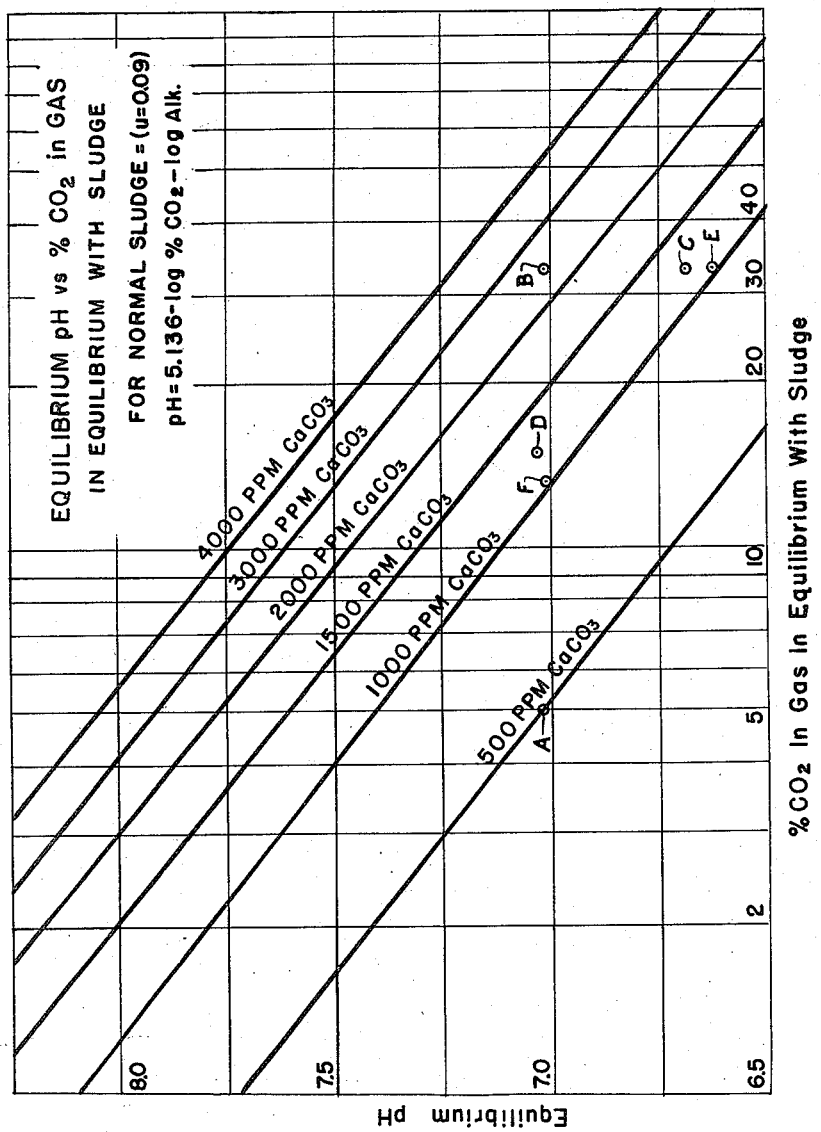
Figure 4 is a graphical representation of certain of the chemical inter-relationships existing in sludge digestion.

The significance of the curves of Figure 4 may be understood through consideration of the chemical reactions involved in sludge digestion. It is well known that a close correlation exists between three chemical characteristics of digesting sludge, these being, namely, the alkalinity, the pH, and the dissolved carbon dioxide. The relationship between these factors is such that, once a state of equilibrium has been reached by the sludge in the course of the digestion process, a knowledge or control of any two will allow the third to be computed or controlled, as the case may be, with a fairly high degree of accuracy.

It has further been observed, that the equilibrium level at which the digestion process is operating, or in other words, the stabilized relationship between alkalinity, pH, and dissolved carbon dioxide, is, in itself, tied in with another characteristic of sludge digestion, namely, the proportion of carbon dioxide in the digester gas evolved. Stated somewhat differently, the evolved gas, insofar as the proportions of its components are concerned, comes into equilibrium with the chemical inter-relationship existing within the digesting sludge between the factors of alkalinity, pH, and dissolved carbon dioxide. As a matter of fact, one gas of uniform composition and quantity is being evolved, it can be safely assumed that chemical equilibrium has been reached within the digesting sludge.

Thus, since, as stated above, the nature of the chemical equilibrium between the sludge can be fixed by controlling or fixing any two of the three sludge characteristics listed, and since the chemical equilibrium thus fixed or controlled determines the proportion of carbon dioxide in the evolved gas, it may be seen that this gas characteristic may be substituted as a parameter for any one of the sludge characteristics in establishing the digestion equilibrium.

Most researchers and others interested in this field have, in order to facilitate analysis and study, made such a substitution, replacing dissolved carbon dioxide of the sludge with the proportion of carbon dioxide in the evolved gas as a controlling parameter, and usually expressing this proportion as a percentage. In keeping with this practice, the curves of Figure 4 have, as their parameters, the alkalinity, the pH and the percent carbon dioxide in the gas in equilibrium with sludge, this last parameter being hereinafter referred to as the carbon dioxide equilibrium of the sludge. The formulation represented by the curves of Figure 4 is based on the ionization constant of carbonic acid and the absorption co-efficient of carbon dioxide and may be written:

$$pH = 5.136 - \log CO_2 + \log \text{alkalinity}$$

In this formula $CO_2$ represents the carbon dioxide equilibrium of the sludge expressed as the percentage of carbon dioxide in the evolved gas, and alkalinity is expressed in parts per million as $CaCO_3$.

The benefits to be derived from the practice of my invention may be illustrated by the following examples. In a digester being put into initial operation, and without seed sludge, the acid producing bacteria, being the most prevalent and easiest to nurture, will predominate at the outset, with the result that a low pH will develop. A long period of time must elapse before the gas producers can overcome this handicap and develop in sufficient number to raise the pH to a level at which they can thrive. As indicated by point A on Figure 4, even if an alkalinity of as little at 500 p.p.m. is present, the pH can be quickly raised to a value of 7.0 simply by reducing the carbon dioxide equilibrium of the sludge to 5%, a reduction which can readily be achieved by the recycling of gas from which carbon dioxide has been stripped.

Under normal continuous digester operating conditions, the evolved gas has a carbon dioxide concentration of approximately 34% and the common value for the alkalinity within the digester is approximately 2500 p.p.m. It may be of interest to note, in passing, the source of this alkalinity. A small amount may be present in the water supply from which the sewage and sludge is derived, but the bulk of the alkalinity in the digester is generated as a by-product of digestion, largely in the form of ammonia combined with bicarbonate. In the digester operating in equilibrium, the concentration of alkalinity present is a function of the ratio established between the rate of alkalinity production, and the rate of removal of alkalinity in digested sludge and supernatant liquid.

Returning then to the normal digester with 2500 p.p.m. alkalinity, and 34% carbon dioxide gas, the pH, as indicated by point B of Figure 4 will be approximately 7.0. Should operating conditions for some reason then change in such a fashion that, while the total solids remain constant, the solids concentration of the sludge pumped to the digester is halved, a new equilibrium will be set up. Since the total solids entering the unit are unchanged, the rate of alkalinity production will not change, but since the quantity of diluent is doubled, the rate of alkalinity removal will rise sharply, and equilibrium will not again be reached until the alkalinity concentration has dropped to 1250 p.p.m., half of the original. As shown by point C of Figure 4, under these conditions the new pH will be about 6.7. This is in a critical zone, and the digester will either commence functioning improperly, or be perilously close to it. However, with the recirculation of gas from which carbon dioxide has been stripped, it will, as indicated by point D of Figure 4, merely be necessary to reduce the carbon dioxide equilibrium of the sludge to approximately 16% or less in order to raise the pH to 7.0 or more.

Activated sludge plants are particularly subject to digester problems because of the relatively dilute nature of the sludge produced. It will consequently be of interest to observe the effect of the application of the process herein set forth to a typical activated sludge plant. A basic activated sludge installation consists of a primary settling station, an aeration station and a secondary settling station. The primary settling station will normally remove approximately 55% of the suspended solids, the resulting sludge being removed from the station at a solids concentration in the order of magnitude of approximately 6%. Such sludg is frequently pumped to a digester station which will normally be operating with an alkalinity of 2,500 p.p.m., and producing gas with a carbon dioxide content of approximately 34%. Again, as indicated by point B of Figure 4, the pH of such a digester will be approximately 7.0. Passage of the effluent from the primary settling station to the aerator and the secondary settling station will remove approximately 35% more of the suspended solids originally contained in the sewage. The total overall solids removal would therefore be approximately 90%. As stated above, however, activated sludge, as taken from the secondary settling station, is quite voluminous. If this sludge is mixed with the sludge from the primary settling station prior to introduction into the digester, the solids concentration of the mixed sludge will be only approximately 2.5%. Pound for pound, the solids contained in primary and in activated sludges produce substantially equivalent amounts of alkalinity when digested. Since, as indicated hereinabove, the alkalinity concentration of the digesting sludge mass as a whole is dependent on the relationship between rate of production of alkalinity in the digester station and the rate of its removal therefrom with digested sludge and supernatant liquid, it may be regarded as a direct function of the solids concentration of the raw sludge entering the digester station. Having reduced this concentration of 6% solids to 2.5% solids through the admixture of activated sludge to the primary sludge, the alkalinity of the digesting sludge will be reduced in proportion to the ratio of these two solids concentrations. Thus, in the instant case, the digesting sludge alkalinity resulting from the digestion of a mixture of primary and activated sludge will be:

$$2500 \times \frac{2.5}{6.0} = 1040 \text{ p.p.m.}$$

Referring to point E of Figure 4, it will be seen that with this alkalinity and a 34% carbon dioxide equilibrium in the sludge, the equilibrium pH will be only about 6.6. Consequently, operating difficulties are likely to be encountered. By practicing the teachings of my invention, however, the carbon dioxide equilibrium of the sludge can as shown by point F of Figure 4, be reduced to approximately 14% at which point the pH will be about 7.0, and the digester will operate satisfactorily.

The digestion of soluble organic industrial wastes, such as for example, wastes from fermentation processes is also amenable to the utilization of my invention. Such digesters are frequently subjected to widely fluctuating loads. Furthermore, it frequently happens that no waste is introduced into the digester over weekends when the plant producing the waste is not operating. Under such conditions the bacteria in the digester consume the bulk of the foodstuff available to them, and, following the natural law governing their behavior, begin to die according to the logarithmic death curve, and decline rapidly in number. At the beginning of the plant work week, a heavy new load is suddenly applied to the digester. Faced with this surfeit of food, the bacteria increase rapidly in numbers in accordance with the logarithmic growth curve. But, as stated previously, the acid producers increase more rapidly than the gas producers, and may, in fact, increase so rapidly as to depress the pH and inhibit a sufficiently rapid development of gas producers. The bacterial balance within the tank is thus disturbed, and the digester fails to function properly. Situations such as these are readily amenable to correction by means of my invention, the results being in accordance with the relationships shown in Figure 4. The preventive and corrective measures constituting the subject matter of this invention are, through the use of suitable instrumentation and control valving, readily adaptable to automatic operation. For example, a pH meter mounted in contact with the digesting sludge can be utilized to furnish electrical or pneumatic signals to actuate the control valves establishing the rate of carrier gas introduction to the digester.

Several collateral benefits will also accrue from the practice of my invention. Obviously, the removal of noncombustible carbon dioxide from a mixture of this gas and the combustible methane of digester gas must result in a higher B.t.u. content in the thus stripped gas. The level to which the B.t.u. of the gas will climb, depends on the proportion of the digester gas which is scrubbed, and on the degree of scrubbing. As a maximum, digester gas may attain about 900 B.t.u. per cubic ft., as compared with a normal value of about 600 B.t.u. per cubic ft.

It should also be noted that if the carbon dioxide is scrubbed out with an alkaline medium, the very undesirable hydrogen sulfide will also be removed. It is well known that hydrogen sulphide may cause serious corrosion and deposition problems if the gas is used as fuel for internal combustion engines or for the supplying of heat.

Still further, the carbon dioxide removed from the digester gas may be recovered, and put to other uses. This is particularly true in industrial waste treatment plants, since there is frequently a demand for carbon dioxide gas in connection with various manufacturing applications.

I claim:

1. In anaerobic digestion of bacterially digestible organic matter in a sludge digester, the method of controlling the pH of the sludge undergoing digestion which comprises the steps of scrubbing digester gas from said digester with an absorbent liquid adapted to absorb carbon dioxide and mixingly contacting said sludge undergoing digestion with said digester gas thus stripped, said stripped gas being effective in absorbing dissolved carbon dioxide from the sludge to an extent sufficient to bring the pH of the sludge to a level favorable to the bacterial digestion process.

2. The method according to claim 1, wherein the contacting of the said digesting sludge with said stripped gas is effected by introducing the stripped gas into a confined zone in communication with the digesting sludge mass, said zone being subject to mechanical agitation.

3. The method according to claim 2, wherein the said confined zone is surrounded by the digesting sludge mass and through which confined zone the digesting sludge mass is mechanically impelled.

4. The method according to claim 1 with the addition that spent absorbent liquid resulting from the said stripping operation is subjected to regeneration treatment whereby carbon dioxide is removed prior to reuse of the thus regenerated liquid in the stripping operation.

5. A treatment system for the anaerobic digestion of bacterially digestible organic matter which comprises in combination, a digester station adapted to contain a body of sludge undergoing anaerobic digestion and to produce a quantity of digester gas, said digester station being equipped with raw sludge inlet means, digested sludge outlet means, and gas withdrawal means; a gas scrubber station adapted to treat said digester gas and to strip therefrom a quantity of carbon dioxide; gas transfer means for supplying gas from said gas withdrawal means to said scrubber station; gas retransfer means for the recycling of said digester gas from which a quantity of carbon dioxide has been stripped from said scrubber station to the said body of digesting sludge; together with means for mixingly contacting retransferred stripped gas with digesting sludge.

6. The treatment system according to claim 5, characterized in that draft tube means, comprising an elongated, substantially cylindrical, open ended conduit, is coaxially positioned within said digester station extending from a point beneath the upper surface of said body of sludge undergoing anaerobic digestion to a point above the bottom of said digester station, said draft tube means being equipped with mechanical sludge impelling means and gas dispersing means.

7. In the anaerobic digestion of bacterially digestible organic matter, the method of establishing and maintaining the pH of the sludge undergoing digestion to lie within the range of 6.8 to 7.2 which comprises the steps of introducing sludge to be digested into a digestion chamber, removing gases of digestion from said chamber, conducting said removed gases of digestion to a carbon dioxide diminishing station, removing a portion of the carbon dioxide content of said gases of digestion in said carbon dioxide diminishing station, conducting said carbon dioxide diminished gases from said carbon dioxide diminishing station to said digestion chamber, contacting said sludge undergoing treatment in said digestion chamber with said carbon dioxide diminished gases and discharging digested sludge from said digestion chamber.

References Cited in the file of this patent

UNITED STATES PATENTS

| | | |
|---|---|---|
| 880,783 | Erlwein et al. | Mar. 3, 1908 |
| 1,047,534 | Joseph | Dec. 17, 1912 |
| 1,519,932 | Reich | Dec. 16, 1924 |
| 2,097,454 | Fischer | Nov. 2, 1937 |
| 2,183,324 | Reich | Dec. 12, 1939 |
| 2,188,847 | Streander | Jan. 30, 1940 |
| 2,196,281 | Voorhees | Apr. 9, 1940 |
| 2,297,195 | Behringer | Sept. 29, 1942 |
| 2,338,402 | Brandt | Jan. 4, 1944 |
| 2,348,125 | Green | May 2, 1944 |
| 2,430,519 | Mallory | Nov. 11, 1947 |
| 2,605,220 | Logan | July 29, 1952 |
| 2,638,444 | Kappe | May 12, 1953 |
| 2,640,027 | McNamee | May 26, 1953 |
| 2,786,025 | Lamb et al. | Mar. 19, 1957 |

FOREIGN PATENTS

| | | |
|---|---|---|
| 441,851 | Germany | Mar. 16, 1927 |
| 286,622 | Great Britain | June 5, 1929 |

OTHER REFERENCES

Sewage Works Journal, vol. 4, No. 2 (Keefer et al.), pp. 247–251.

The Chemistry of Water and Sewage Treatment-Buswell, publ. by Chemical Catalog Co. Inc., New York, pp. 258–259.